US008630331B2

(12) United States Patent
Crosta et al.

(10) Patent No.: US 8,630,331 B2
(45) Date of Patent: Jan. 14, 2014

(54) METHOD AND SYSTEM FOR SPREAD SPECTRUM SIGNAL ACQUISITION

(75) Inventors: Paolo Crosta, Vimodrone (IT); Davide Rovelli, Vimodrone (IT); Patrizia Iacone, Vimodrone (IT)

(73) Assignee: Thales Alenia Space Italia, S.p.A., Rome (IT)

( * ) Notice: Subject to any disclaimer, the term of this patent is extended or adjusted under 35 U.S.C. 154(b) by 300 days.

(21) Appl. No.: 13/125,204
(22) PCT Filed: Oct. 26, 2009
(86) PCT No.: PCT/EP2009/064088
§ 371 (c)(1),
(2), (4) Date: Apr. 20, 2011
(87) PCT Pub. No.: WO2010/049392
PCT Pub. Date: May 6, 2010

(65) Prior Publication Data
US 2011/0200074 A1 Aug. 18, 2011

(30) Foreign Application Priority Data

Oct. 29, 2008 (EP) ................................. 08425696

(51) Int. Cl.
*H04B 1/00* (2006.01)
(52) U.S. Cl.
USPC ........................................................ 375/147
(58) Field of Classification Search
USPC ......... 375/130, 140, 147, 149, 150, 152, 316, 375/346, 340, 343; 708/100, 200, 400, 403, 708/404, 405, 422; 370/203, 210, 335, 442, 370/441; 342/904
See application file for complete search history.

(56) References Cited

U.S. PATENT DOCUMENTS

| | | | |
|---|---|---|---|
| 6,285,316 B1 * | 9/2001 | Nir et al. ................... | 342/357.46 |
| 6,452,961 B1 * | 9/2002 | Van Wechel ................... | 375/142 |
| 6,618,433 B1 * | 9/2003 | Yellin ........................... | 375/148 |
| 7,436,878 B1 | 10/2008 | Harris et al. | |
| 2003/0161543 A1 | 8/2003 | Tanaka | |
| 2006/0082491 A1 * | 4/2006 | Arikan et al. ................... | 342/95 |

FOREIGN PATENT DOCUMENTS

CN 1889546 A1 1/2007

OTHER PUBLICATIONS

Liu, Hu Bo: "A Fast Joint Frame Synchronization and Frequency Offset Acquisition Algorithm for OFDM Systems," 2008 IEEE Wireless Communications and Networking Conference Mar. 31-Apr. 3, 2008 Las Vegas, NV, USA, pp. 1267-1272, XP00252187, 2008 IEEE Wireless Communications and Networking Conference IEEE Piscataway, NJ, USA.
Wang Hongyan Wu Yanhong: "Estimation of Doppler parameters for spacebourne SAR based on fractional Fourier transform" 2004 7th International Conference on Signal Processing Proceedings Aug. 31-Sep. 4, 2004 Beijing, China, vol. 3, Aug. 31-Sep. 1, 2004 pp. 1981-1984, XP002521878.
Author Unknown, Database EPODOC European Patent Office, The Hague, NL; Aug. 27, 2008, "High peformance OFDM frame synchronization algorithm" XP002521879.

* cited by examiner

*Primary Examiner* — Sam K Ahn
*Assistant Examiner* — Vineeta Panwalkar
(74) *Attorney, Agent, or Firm* — Baker & Hostetler LLP

(57) ABSTRACT

A method for acquiring a direct sequence spread spectrum signal, which is transmitted on a carrier frequency and is modulated with a code signal of length equal to Nc chips, for determining a code delay of the spread spectrum signal and a Doppler shift with respect to the carrier frequency, the determination being performed on a discrete two-dimensional space of M possible code delays and F possible frequency shifts, includes: receiving and sampling the spread spectrum signal to obtain a sampled spread spectrum signal; performing a despreading operation of the sampled spread spectrum signal with a local replica signal of the code signal, by performing the despreading for a plurality of possible code delays between the sampled signal and the replica signal; and performing a parallel frequency search on the result of the despreading step, by performing a step of computing a Fourier transform on the result. The Fourier transform is a fractional Fourier transform.

14 Claims, 6 Drawing Sheets

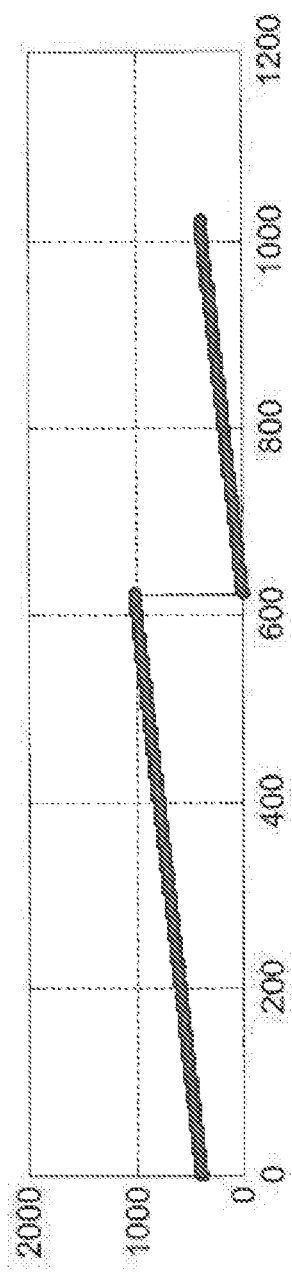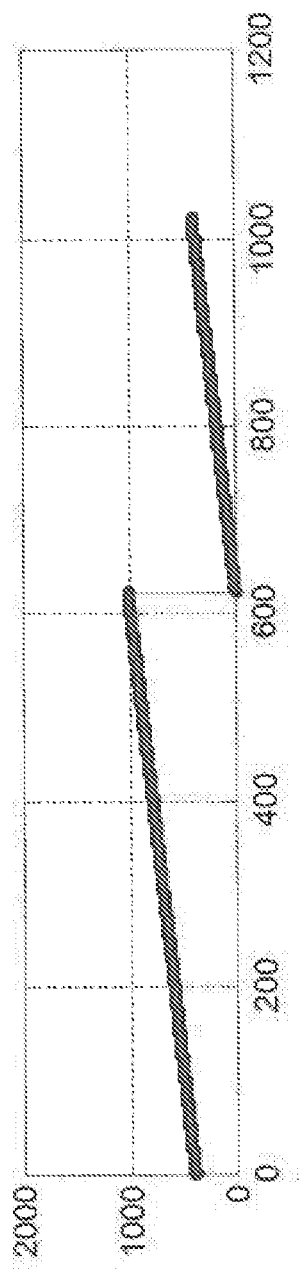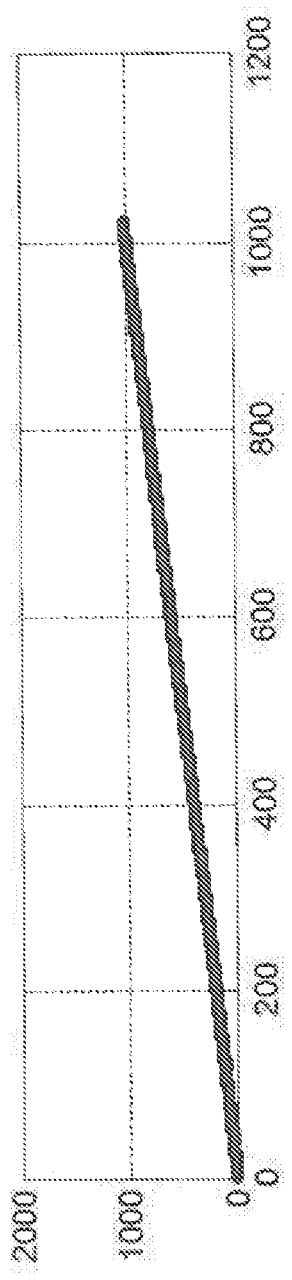
FIG. 3a
FIG. 3b
FIG. 3c

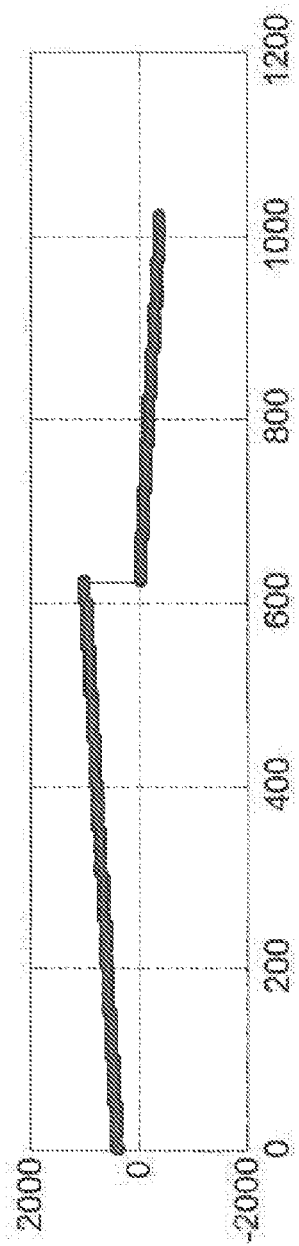
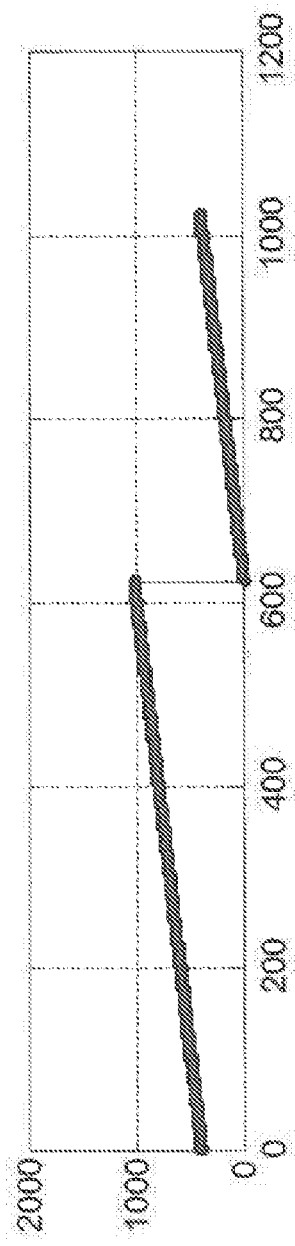
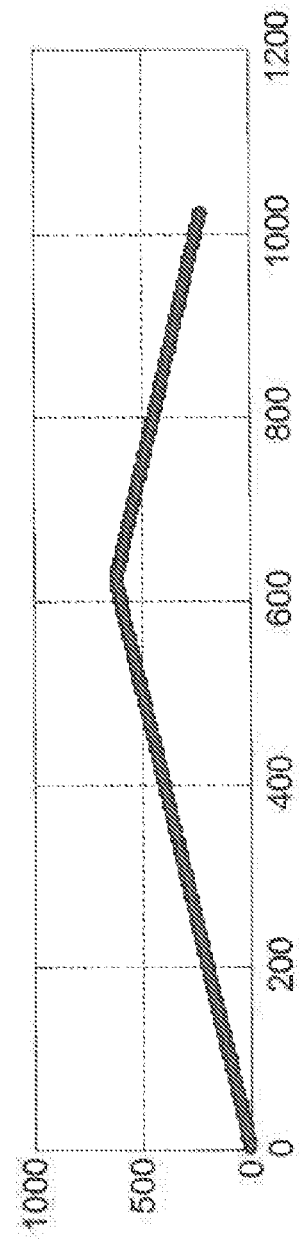
FIG. 4a
FIG. 4b
FIG. 4c

METHOD AND SYSTEM FOR SPREAD SPECTRUM SIGNAL ACQUISITION

CROSS-REFERENCE TO RELATED APPLICATIONS

This application is a National Stage of International patent application PCT/EP2009/064088, filed on Oct. 26, 2009, which claims priority to foreign European patent application No. EP 08425696.5, filed on Oct. 29, 2008, the disclosures of which are incorporated by reference in their entirety.

FIELD OF THE INVENTION

The present invention relates to spread-spectrum communication systems, and in particular it refers to a spread spectrum signal acquisition method, according to the preamble of first claim. The present invention also refers to a spread spectrum signal acquisition system.

BACKGROUND OF THE INVENTION

Among different so called spread spectrum systems, those called direct-sequence spread spectrum (DSSS) are currently among the most popular.

For instance, the use of a direct-sequence spread spectrum technique DSSS provides wide bandwidth channel sharing by means of code division multiple access technique (CDMA).

The CDMA access technique foresees that a plurality of transmitters share the same channel each using a different pseudo-random code, cross correlation among different codes being equal to zero. Then a receiver has to select a suitable pseudo-random code and execute an acquisition method, which allows the receiver to determine frequency and code delay of received signal. In some applications, for example in GNSS type applications (Global Navigation Satellite System), the receiver is not previously aware if a received signal has been transmitted from a specific transmitter, so that the acquisition method is tried out using possible replicas of different pseudo-random codes, available to the receiver.

In particular, in a GNSS receiver, the first task of the receiver is to search for signals transmitted by satellites. This process is called acquisition method. When a signal is discovered, this same signal is traced in order to obtain the information required for determining the receiver's position. If the signal, for some reason, is lost, the acquisition method is executed again, for searching the same satellite or another satellite. The signal acquisition method represents a search in a two dimensional time space (for determining phase or code delay) and frequency (for determining Doppler carrier shift, i.e. frequency shift with respect to carrier nominal frequency, due to the fact the satellites are moving along orbital trajectories at speeds of several km per second, creating a significant Doppler shift, which is also caused by frequency misalignment of transmitter and receiver clocks). More precisely, the two dimensional space search is defined in an uncertainty region of such space. The search space is quantized in both dimensions, and time and frequency are divided in a finite number of units or "bins".

In the known art, several GNSS signal acquisition methods are known, or more generally various spread spectrum signal acquisition methods are known, for determining, in the receiver, the code delay and Doppler shift for a received signal.

Acquisition methods are for instance known, which are called "matched filter" (or serial search) methods. In this type of methods, possible "bins" of Doppler shift and code delay are sequentially scanned. This type of methods, described for example in US 2003/0161543, has the drawback of requiring long periods of time for scanning the two dimensional search space.

So called "parallel search" acquisition methods are also known, which comprise parallel analyzing of a dimension of the two dimensional search grid. Since this grid is two dimensional, two different types of parallel search methods exist:

parallel code search (PCS), wherein all code delay bins are simultaneously tested;

parallel frequency search (PFS), wherein all frequency shift bins are simultaneously tested.

The PCS and PFS methods ensure good results in terms of scan time of search grid. However, the PCS methods require a large memory, whereas PFS methods have a high computational cost.

SUMMARY OF THE INVENTION

The object of the present invention is to provide an acquisition method having a performance which represents a compromise between scan time of search grid, computational cost and memory requirements.

The above and other drawbacks are solved by embodiments of the present invention. One or more embodiments provide a method for the acquisition of a direct-sequence spread spectrum signal, which is transmitted on a carrier frequency, and which is modulated with a code signal, of length equal to Nc chips, for determining a code delay of said spread spectrum signal and a Doppler shift with respect to said carrier frequency, where the determination is performed on a discrete two-dimensional space of M possible code delays and F possible frequency shifts. The method includes: receiving and sampling the spread spectrum signal to obtain a sampled spread spectrum signal; performing a despreading operation of the sampled spread spectrum signal with a local replica signal of the code signal, by performing the despreading for a plurality of possible code delays between the sampled signal and the replica signal; and performing a frequency search by performing a step of computing a Fourier transform. The frequency search is a parallel frequency search performed on the result of the despreading step, and the Fourier transform is a fractional Fourier transform performed on the result.

Another embodiment of the present invention provides an acquisition system including a processing unit for performing the method.

Another embodiment of the present invention provides a GNSS signal receiver including the acquisition system.

BRIEF DESCRIPTION OF THE DRAWINGS

Further characteristics and advantages of the present invention will become apparent from the following description of preferred and non limiting examples of the same invention; wherein:

FIG. 3a-3c, 4a-4c and 5a-5c show some diagrams of signals involved in the acquisition method of FIG. 1.

DETAILED DESCRIPTION

Figure 1:
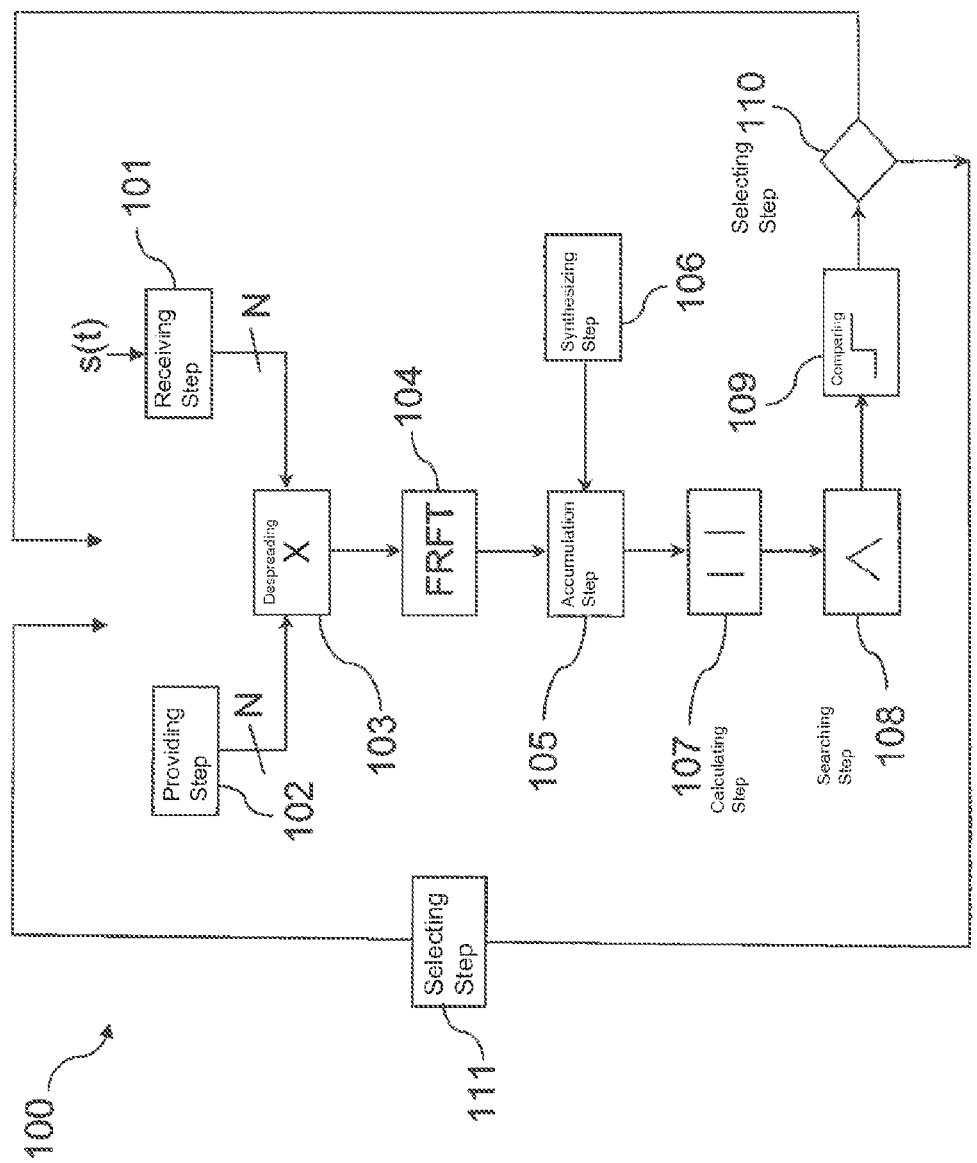
FIG. 1 shows a functional block diagram of a spread spectrum signal acquisition method.

With reference to FIG. 1, with 100 is globally indicated a direct-sequence spread spectrum signal acquisition method s(t) or DSSS signal acquisition method. For instance, signal s(t) is a signal provided by a satellite of a GNSS system and is preferably a CDMA signal (Code division multiple access). According to a further embodiment, the signal s(t) is a CDMA signal of the type provided in an UMTS system.

Signal s(t) is a signal modulated with a pseudo-random code signal, or PRN code, with length Nc and which is transmitted over a carrier frequency. For example, the code signal is comprised of Nc=4092 chips, which are repeatedly transmitted every Tc=4 ms (Tc represents the so called code epoch), as is the case for example of E1-B and E1-C signals provided by satellites of the GALILEO constellation.

The acquisition method 100 comprises a step 101 of receiving signal s(t). Preferably, the receiving step 101 comprises a step of suitably processing signal s(t) in order to demodulate and convert said signal to baseband (or almost to baseband), an extraction step of in-phase and quadrature components of the baseband signal and a sampling step at frequency $f_s$, in order to transform the received signal into a stream of complex digital samples. The above steps are known to the skilled in the art, and therefore will not be described in further detail.

According to an embodiment, the receiving step 101 comprises a decimation step of stream of complex digital samples in order to reduce the frequency of this stream from value fs to a reduced value fk, which represents the operating frequency, or clock frequency, of the acquisition method 100. For example, one may define fk=fs/2. In this case, as will be detailed in the following, for de-spreading of received signal a local replica of sampled PRN code at frequency fk has to be used, which is therefore comprised of M=tc*fk samples. Preferably, in receiving step 101 a filtering of stream of digital samples is provided, before decimation, by means of a low-pass filter, for example by means of a FIR filter, in order to avoid or reduce the aliasing phenomenon occurring on the decimated stream.

In an advantageous embodiment, the receiving step 101 comprises the step of storing the digital samples of the received signal, which, in this example is filtered and decimated, on a delay line, provided with N taps. Preferably, the number of taps N is a submultiple integer of sample number M of local replica of code PRN, i.e. an integer Mn exists, for which the following holds Mn=M/N.

It is appreciated that the storing of digital samples of received signal in a delay line provided with N taps provides, at any clock instant, a set of N consecutive samples of received signal, i.e. N-long segments, having different clock times and code delay increasing between 0 and N−1, with respect to a locally available code reference.

As is known, the received signal s(t) shows, with respect to signal output from satellite, a code delay, or phase delay, and a Doppler shift with respect to transmitted carrier frequency. The acquisition method 100 is therefore provided for determining a code delay, or phase delay, of received spread spectrum signal and a Doppler shift with respect to carrier frequency of transmitted signal (in this example, by the satellite), said determination being conveniently performed on a two dimensional discrete space of M possible code delays and F possible frequency shifts, wherein M is the length of local replica of PRN code, sampled at frequency fk and F is a positive integer.

With reference to FIG. 1, the acquisition method 100 comprises a step of providing 102 a local replica signal of pseudo-random code signal, or PRN code. Such signal represents a code reference.

In a particularly preferred embodiments, the M samples of PRN code, sampled at operating frequency fk, are stored into a look-up table, i.e. in a matrix data structure, comprising vectors with length N, each provided for storing an N-long segment of PRN code, and wherein consecutive segments of PRN code are sequentially stored in consecutive vectors of said matrix data structure. From now on, we will assume, without introducing any limitation, that the data structure is formed by a matrix with N rows and Mn columns and that the first N samples of PRN code are stored in the first column C1 of matrix data structure, the following N samples of PRN code are stored in second column C2 of matrix data structure, and so on. According to this embodiment, step 102 of providing a local replica of the PRN code comprises the step of reading from look-up table the samples of PRN code stored in the same, in order to provide samples vectors having length N.

Moreover, the acquisition method 100 comprises a step 103 of performing a despreading of sampled spread spectrum signal, in this example at operating frequency fk, by means of local replica signal of PRN code, by performing said dispreading for a plurality of possible code delays between the sampled signal and the replica signal of PRN code.

According to an embodiment, the step of despreading 103 comprises the steps of despreading, by means of Mn=M/N consecutive N-long segments of local replica signal, of Mn=M/N N-long segments of sampled signal, by performing, for each of said Mn segments of local replica signal, a despreading for N possible consecutive delays between said local replica signal and said sampled signal. The step of despreading 3 is such as to provide, at output, a plurality of vectors, which will be called "despreaded vectors", comprising Mn despreaded vectors for each code delay.

Preferably, the operation of despreading is a bit-by-bit multiplication of two N-long vectors. From now on, reference will be almost exclusively made to a despreading step 103, in which the despreading is performed by performing a bit-by-bit vector multiplication without introducing any limitation.

Figure 2:
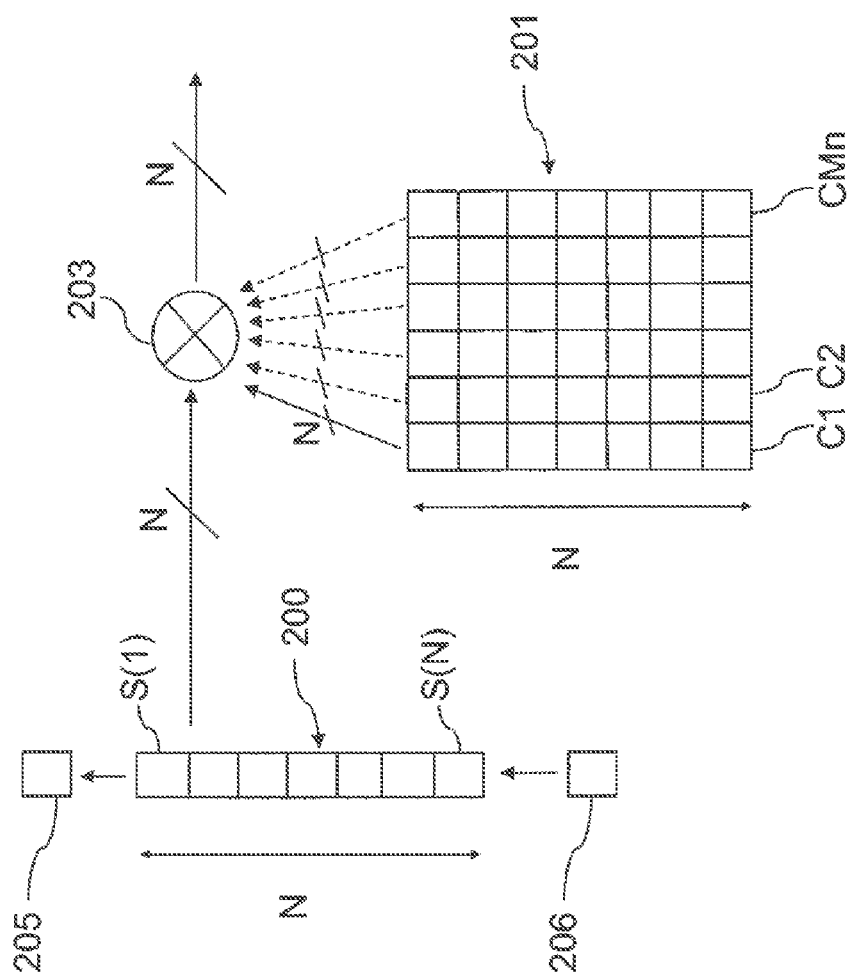
FIG. 2 shows a graphic and schematic diagram of one of the steps of acquisition method of FIG. 1.

With reference to FIG. 2, 200 is a delay line containing, at any instant, N samples of the received signal and 201 indicates the look-up table containing the samples of the local replica of PRN code. At a given instant, the N stored samples in the delay line 200 are multiplied by N stored code samples in a column C1 of look-up table 201. In the following step, the content of the delay line 200 will be updated by shifting by one position the samples stored in the previous step, wherein an old sample 205 is output from the delay line 200 and a new sample 206 is introduced into the delay line. The updated content of delay line 200 is multiplied using vector multiplication 203 by the N samples of column C1 of look-up table 201. This is equivalent to a despreading of an N-long segment of received signal by an N-long segment of PRN code, with an additional code delay equal to one between the received signal and the PRN code, with respect to the preceding step. This operation is performed for N consecutive times, i.e. for N code delays, updating at each step the content of delay line 200, but without changing column C1. Afterwards, a multiplication of content of delay line 200 by column C2 for additional N code delays is performed, i.e. by updating N times the content of delay line 200, and so on, until reaching multiplication by column CMn. Once the N multiplication of content of delay line 200 and content of column CMn has been also performed, i.e. after a complete column-by-column scan of look-up table 201, for each code delay between 0 and N−1, Mn despreaded N-long vectors will be available.

With reference to FIG. 1, the result of despreading step 103 is subject to a following step 104 of calculating a Fourier transform, in order to perform a parallel frequency search on results provided by output of despreading step 103. If the despreading 103 is performed by using a vector bit-by-bit multiplication, it is appreciated that such multiplication combined with the Fourier transform represent a correlation step, wherein, additionally, due to multiplication by a complex exponent, included in the Fourier transform, a parallel removal of plural Doppler frequencies is performed.

Advantageously, the applied Fourier transform is a fractional Fourier transform. This transform step allows the calculation of the Discrete Fourier Transform (DFT), which is applied only on a portion of the spectrum, at higher resolution, as opposed to applying the same to the range of all possible frequencies $[-f_k/2, f_k/2]$. Preferably, the fractional Fourier transform is calculated on F samples, which are uniformly distributed in the interval $[-\Delta f_w/F, +\Delta f_w/F]$, and more preferably, F=N, wherein N is the dimension of vectors output by the despreading step 103. The interval $[-\Delta f_w/F, +\Delta f_w/F]$ may therefore be selected as an interval suitable for covering the most usual Doppler frequencies a received signal may have.

In this way, the output of the transform is a representation of the vector input in a space of N frequency samples, which are separated by $\Delta f_d = \Delta f_w/F = \Delta f_w/N$.

According to an embodiment, the fractional Fourier transform is performed by performing two fast Fourier transforms (FFT) on $2*N_{opt}$ samples; wherein $N_{opt}$ is for example selected as the smallest power of two greater than N. It is to be noted that, with respect to a traditional FFT transform, the computational saving is huge, since in order to reach the same resolution with an FFT-type algorithm, a number of samples equal to $f_s/\Delta f_d = (f_s N)/(\Delta f_w) >> N_{opt}$ would be required.

In a particularly preferred embodiment, the calculation of a Fourier transform 104 comprises the calculation of the Fourier transform of each of the despreaded vectors output by step 103, in order to obtain a plurality of respective vectors transformed in a discrete frequency domain.

With reference to FIG. 1, the method 100 moreover comprises a step of accumulating 105, 106, in a coherent way, the despreaded vectors output by step 103, and associated to same code delay, so that a plurality of cumulative vectors is obtained, each one of them being associated to a respective code delay.

According to a particularly preferred embodiment, the accumulation step 105, 106 is performed after the Fourier transform 104, by coherently accumulating into N cumulative vectors the despreaded vectors associated to the same delay between 0 and N−1, and transformed into the frequency domain by the Fourier transform step 104. It is to be noted that according to the embodiment conforming to diagrams of FIGS. 1 and 2, during the accumulation step 105, two despreaded vectors associated to a same delay will be available for accumulation in the same cumulative vector relative to said delay, every N input samples of delay line 200. In fact, after N new samples input into delay line 200, the received and sampled signal is shifted by N samples, but also the local replica of PRN code is shifted by the same quantity, due to the column shift in look-up table 201. It is appreciated that in the present example a frequency transformed despreaded vector represents a correlation contribution associated to a given code delay and which is to be added (i.e. cumulated) to other correlation contributions associated to same delay.

In a particularly preferred embodiment, the accumulation step 105 comprises a step 106 of synthesizing a phase correction signal, of correcting by means of said phase correction signal the result of the accumulation 105 at preceding step, related to a given delay between 0 and N−1, and adding the accumulated and corrected result to a new despreaded vector associated to said delay, between 0 and N−1. In practice, a phase correction is applied to the content of each cumulative vector before adding a new despreaded vector, or, more specifically, its Fourier transform, to the content of said cumulative vector.

Preferably, the phase correction is performed by multiplying each element v(i), where i is between 0 and N−1, of a cumulative vector v by a respective phase correction factor $$p_i = e^{j2\pi \hat{f}_{D,i} i},$$

with $0 \leq i \leq N$, where $\hat{f}_{D,i}$ is the discrete Doppler frequency (frequency bin) associated to the i-th element of transformed cumulative vector.

In the example shown, starting with N multiplications of the content of delay line 200 by the content of column C1, by scanning the whole matrix 201 of PRN code, column by column, when the N multiplications of content of delay line 200 and content of column CMn are completed, for each delay between 0 and N−1, Mn despreaded N-long vectors will be accumulated, which are transformed into the spatial domain of discrete Doppler frequencies. In other words, at the end of accumulation step 105, a matrix of complex numbers or search matrix, will be obtained, which in this example is an N×N matrix, which identifies a search space of N delays and N discrete frequencies.

With reference to FIG. 1, the acquisition method 100 comprises:

a successive step 107 of calculating the modulus, simple or quadratic, of elements of said search matrix;

a successive step 108 of searching a maximum, or peak, of moduli of elements of search matrix;

a successive step 109 of comparing the maximum with a threshold, in order to determine if the signal acquisition has occurred.

As shown in FIG. 1, from selection step 110, if the satellite acquisition has been ascertained, method 100 moreover comprises a step 111 of selecting another look-up table containing the samples of a PRN code relative to a different satellite and a new iteration of method 100 for acquiring said satellite, and so on, for possible additional satellites of the GNSS constellation to be acquired.

As indicated by selection step 110, if the comparison with a threshold has not provided the signal acquisition, the above said steps of method 100 are repeated from the beginning:

by resetting the cumulative vectors written at step 105; and by performing the despreading step 103, this time starting from the second column C2 of look-up table 201.

If after this iteration, in the selection step 110, the signal acquisition is not ascertained, the steps of method 100 are repeated, starting from the third column of look-up table, and so on, until the last column CMn is reached. As can be clearly seen from above said description, in this way the search for M possible code delays is performed by considering single consecutive segments of N delays.

According to a modification, instead of searching each time for a maximum, after scanning a segment of N possible code delays, it is possible to repeatedly perform the search, always by dividing into sub-searches of segments of N possible delays, by entirely scanning a whole PRN code, multiple times, and by accumulating in a non-coherent way (i.e. after performing step 107 of modulus computation) the Nacc (an arbitrary integer) N×N dimensional search grids, obtained by repeating the scan of the matrix containing samples of PRN codes, starting from the same column. If no peak is found, the search on successive N PRN code delays of a new PRN code is performed. If, after scanning for M possible delays, no peak is found, the search for a new PRN code is started over again (in this practical example, the search for a new satellite). It is to be noted that this acquisition strategy is such as to increase search time, although it increases the sensibility of the acquisition method. Therefore, it is convenient to set $N_{acc}=1$, with relatively high carrier to noise power ratios (this is equivalent to saying that the normal method described with reference to FIG. 1 is performed), and instead setting $N_{acc}>1$ for relatively low carrier to noise ratios.

According to a further embodiment, it is possible to foresee a real time estimation step of noise power by adaptively varying, based on the estimation, the threshold used for the comparing step, at step 109. In a particularly preferred embodiment, the estimation of noise power is performed based on the transformed despreaded vectors output by transformation step 104. For example, the quadratic modulus (or modulus) of complex vectors output by transformation step 104 is calculated and a median is formed on all the transform outputs (the noise power is an invariant with respect to frequency) and then time-filtered, preferably by using a first order IIR filter (Infinite Impulse Response). Such a filtration allows the reduction of estimation noise.

According to a particularly preferred embodiment, the threshold is set at a real multiple of estimated noise power, said multiple being defined based on specific false-alarm probability requirements, and is updated in real time or almost in real time.

Above said method may be implemented by a software, or by combining hardware and software, for example into a FPGA.

In a further modified embodiment, which is conveniently implemented when, in the received signal, a secondary PRN code or a sequence of symbols or information bits is superimposed to the primary PRN code (the characteristics of a data sequence or of a secondary code with respect to a primary code are well known to the skilled in the art; in other words, the chip of the secondary code is as long as a whole primary code and a symbol or information bit is as long as an integer number of times the primary code), since this secondary code or data sequence may falsify the result of the coherent accumulation, it is possible to foresee that the despreading step 103 is performed by keeping the same starting column of matrix 201 for two or more complete scans of all columns C1-CMn of said matrix.

In the following, the above said problem and its solution will be more clearly described.

FIGS. 3a, 3b and 3c show the variation in time of the code phase of received signal (i.e. the input signal of delay line), the local replica signal of PRN code (i.e. the one extracted from the look-up table) and the content of the coherent accumulator (step 105 of method of FIG. 1), respectively. For clarity of the representation, in FIGS. 3a and 3b, the sequence of the primary PRN code is represented by a rising ramp, although in reality it's a rectangular sequence of positive and negative symbols; in FIG. 3c the amplitude of modulus of content of coherent accumulator is shown. The diagrams of FIGS. 3a, 3b, 3c have been traced, on the assumption that no secondary code is present. The code phase is represented, by diagram convention, as a rising integer number from 0 up to a maximum number of chips in the code minus 1. In this case, a code length of 1023 has been considered. As can be seen from FIGS. 3a, 3b, 3c, the received signal (FIG. 3a) and the PRN code signal (FIG. 3b) are perfectly aligned, i.e. they have the same code phase at the same instant in time, and the coherent accumulation (FIG. 3c) is always increasing, reaching a maximum value equal to the code length.

In FIGS. 4a, 4b, 4c diagrams are shown, which correspond to those represented in FIGS. 4a, 4b, 4c, for the case when a secondary PRN code is present, i.e. a code, whose chip is as long as a whole PRN primary code (1023 in this example) and by hypothesizing a sign transition between the chip of the secondary code and the following chip. Graphically, this sign inversion is represented as a sign change in the code phase of the received signal (FIG. 4a). Obviously, such an inversion can only occur when the code phase is 0, i.e. at the beginning of each primary code. As in the situation of FIGS. 3a and 3b, the received signal and the code signal are perfectly aligned but the coherent accumulation of FIG. 4c cannot reach the maximum preceding value (FIG. 3c), since across the sign transition of secondary code chip, it begins to fall and the final value is almost zero. The final value depends on the initial code phase of received signal.

In order to eliminate this problem, the identified solution foresees to keep the same starting column of the matrix containing the code, for two code epochs, instead of only one. The code epoch is the temporal length of a code. This would therefore correspond to extending the coherent integration time to 2 code epochs.

Figure 5A:
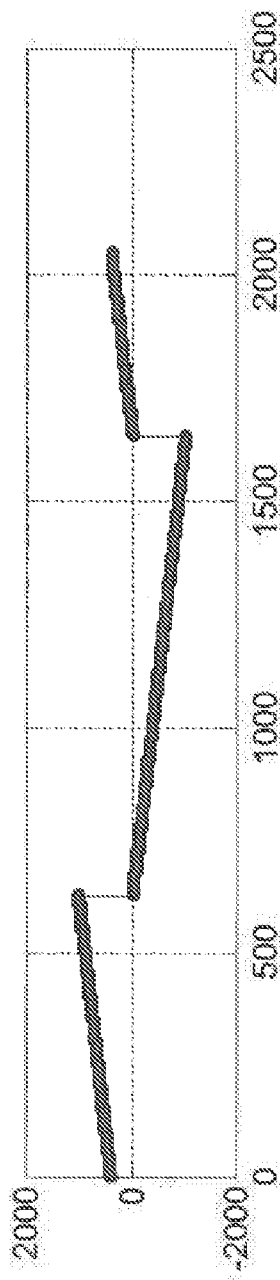
Figure 5B:
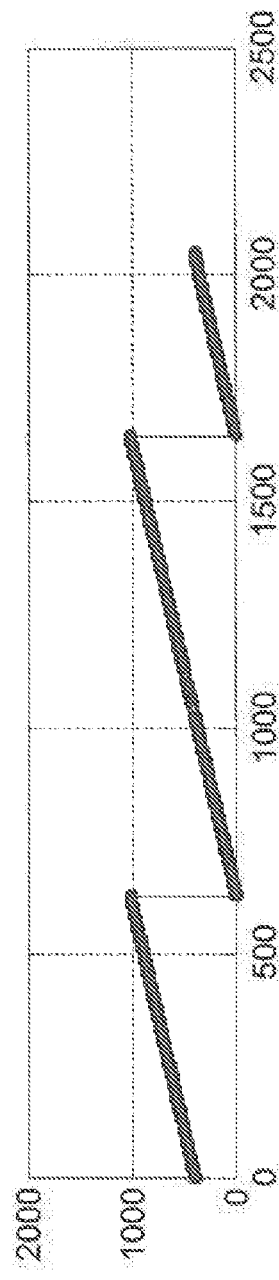
Figure 5C:
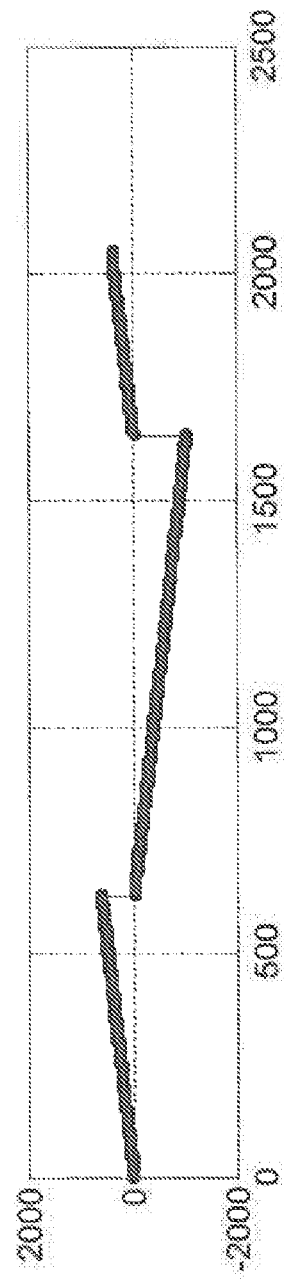

In FIGS. 5a, 5b, 5c, FIGS. 5a and 5b refer to the same case of FIGS. 4a and 4b (being identical to the same) whereas FIG. 5c shows the result of the accumulation, in the case of above said solution. In practice, the coherent accumulator is reset at the beginning of a new code epoch, i.e. when the phase of PRN code signal starts again from 0, so that again a maximum (modulus) value equal to 1023 is obtained (the sign "−" in the diagram is only due to the sign transition).

However, the result of the above said operation is an increase of the total acquisition time, by a factor of two, and in the general case, of more than one accumulation, it entails the loss of only one code epoch time.

Figure 6:
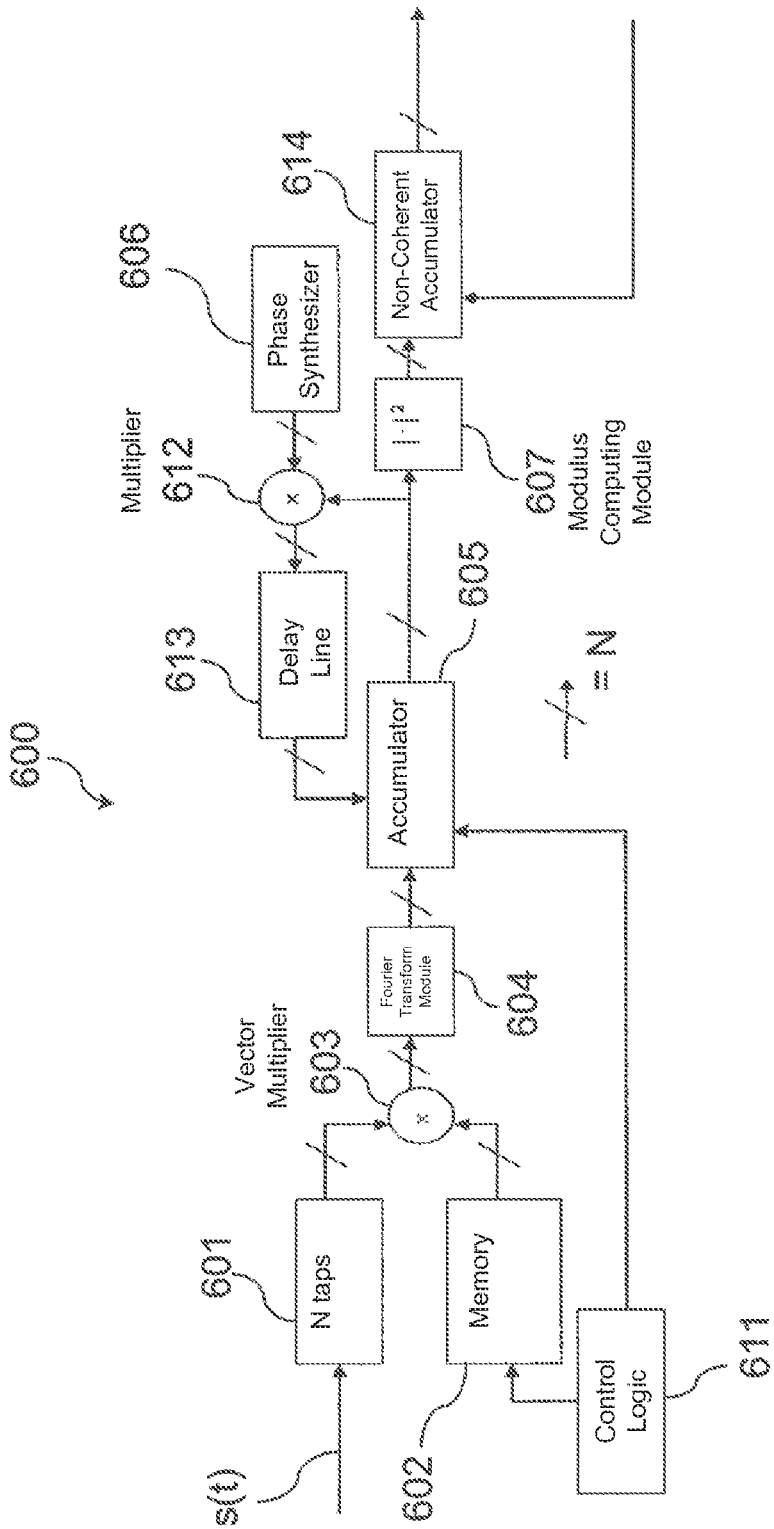
FIG. 6 shows an exemplified functional block diagram of a spread spectrum signal acquisition system.

FIG. 6 shows, in a very schematic and illustrative way, the block diagram of an acquisition system 600 for executing the above said acquisition method. This system is for example a component of a GNSS receiver, as a satellite navigator.

System 600 comprises a delay line with N taps 601, for storing the samples of a complex, received baseband or almost baseband signal, which is optionally previously filtered and decimated.

System 600 moreover comprises at least one memory 602, for example a look-up table for storing a local replica of the PRN code, according to the already described procedure, with reference to method 100. Preferably, system 600 comprises a memory 602 for storing more than one look-up table, each of them relating to a PRN code of a respective satellite.

System 600 moreover comprises a vector multiplier 603 for performing the despreading step 103 of the method.

System 600 moreover comprises a module 604 for performing the Fourier transform of complex vectors produced and output by multiplier 603, according to the description of method 100. Furthermore the system is provided with a coherent resettable accumulator 605, for outputting cumulative vectors, each associated to a respective code delay, between kN and kN−1 (where k is an integer), a module 607 for computing the modulus or quadratic modulus, and which is preferably provided with a resettable non coherent accumulator 614, for integrating on $N_{acc}>1$ successive code epochs, according to the description of method 100. The zeroing of this accumulator 614 is performed before the beginning of the search for a new code signal from a satellite.

The acquisition system 600 moreover comprises a phase synthesizer 606 for phase correction, by means of multiplier 612, of cumulative vectors in order to allow a coherent accumulation with vectors which are successively provided by the output of transformation block 604. The system 600 moreover comprises a delay line 613 for delaying the output of multiplier 613 by N clock cycles, said delay being such as to account for the fact that the update of each of the cumulative vectors by the contributions output by block 602 occurs every N clock cycles, as already described for the acquisition method 100.

System 600 also comprises a control logic 611, for correctly addressing the columns of the look-up table stored in memory 602 and for sending, with a correct timing required by above said method 100, a reset signal to the coherent accumulator 604.

In FIG. 6 the portions of system 100 related to the noise power estimation, to the setup and update of threshold, to the computation of maxima and threshold comparison are not shown for clarity purposes.

System 100 may be implemented by means of a suitable combination of hardware and software, for example in a FPGA or ASICs.

Experimental results, obtained by simulations using MATLAB™ or GRANADA™ have confirmed that an acquisition method of above said type is advantageous in that it is fast, accurate, highly flexible, allowing acquisition of more than one type of signal and which may be applied for other spread spectrum signals, of a type different from GNSS CDMA signals.

As an example, the acquisition of an Elc signal of the GALILEO GNSS system has been simulated, with a code dimension $M=T_c \times F_k$ equal to 19,000 (i.e. the number of samples in a code epoch with $T_c=4$ ms, and $F_k=4.75$ MHz, with four samples for each chip), wherein a Doppler search window has been selected, at 20 kHz with 120 possible frequency offsets, to be searched (frequency bins). The following table compares the performance of above said method ("ACSE" as indicated in the table, for Acquisition Speed-Up Engine Algorithm), with respect to methods of the known art. The computational cost indicated by table is the number of complex multiplications required for scanning the whole search grid.

| Type of acquisition method | Computational cost | Time for scanning the search grid | Length of FFT | Number of samples to be stored for each iteration |
|---|---|---|---|---|
| Matched filter search | 4.33e10 | 9120 | — | 0 |
| Parallel phase search | 0.026e10 | 0.48 | $2^{16}$ | 65536 |
| Parallel frequency search | 4.44e14 | 76 | $2^{30}$ | 108 |
| ACSE | 0.81e10 | 1.22 | $2^8$ | 15625 |

As can bee observed from the data provided in this table, the ACSE method has a computational cost which is lower than other algorithms, with the exception of the parallel phase search, which, on the other hand, requires longer FFT, which is problematic when the method is implemented on a FPGA.

It is therefore evident that a method of above said type provides advantages, in that it requires relatively low computational costs (comparable with those of the parallel phase search acquisition and much lower than those of other types of methods), relatively short search times and relatively reduced memory requirements.

A skilled in the art, in order to comply with contingent and specific needs, may introduce several modifications and variations to above said method and acquisition system, which nonetheless all lie in the protection scope of the invention, as defined by the appended claims.

The invention claimed is:

1. A method for the acquisition of a direct-sequence spread spectrum signal, which is transmitted on a carrier frequency, and which is modulated with a code signal of length equal to Nc chips, for determining a code delay of said spread spectrum signal and a Doppler shift with respect to said carrier frequency, said determination being performed on a discrete two-dimensional space of M possible code delays and F possible frequency shifts, the method comprising:
   receiving and sampling said spread spectrum signal to obtain a sampled spread spectrum signal;
   performing a despreading operation of said sampled spread spectrum signal with a local replica signal of said code signal, by performing said despreading for a plurality of possible code delays between said sampled signal and said local replica signal, wherein the despreading includes despreading using consecutive long segments of the sampled signals, the long segments being of a length N, where N is a submultiple integer of a sample number denoted by M of the local replica signal, a number Mn of the despreaded segments of the sampled signals being given by Mn=M/N;
   by performing a step of computing a Fourier transform, wherein
   said frequency search is a parallel frequency search performed on a result of said despreading operation, and
   said Fourier transform is a fractional Fourier transform performed on said result; and
   performing, using each of said Mn segments of the local replica signal, the despreading for N possible successive delays between said local replica signal and said sampled signal.

2. The method according to claim 1, wherein the despreading step provides at output a plurality of despreaded vectors, said plurality of despreaded vectors comprising Mn despreaded vectors for each code delay.

3. The method according to claim 2, wherein said step of computing a Fourier transform comprises a step of computing the Fourier transform for each of said despreaded vectors of said plurality of despreaded vectors, for obtaining a plurality of respective transformed vectors in a discrete frequency domain.

4. The method according to claim 1, wherein the despreading step comprises a step of multiplying, sample by sample, signal segments by respective replica segments, providing respective product vectors, and wherein said step of computing the Fourier transform is performed on each of said product vectors.

5. The method according to claim 1, further comprising:
   coherently accumulating, into cumulative vectors, despreaded vectors associated to a same code delay, and providing N cumulative vectors, each associated to a respective delay.

6. The method according to claim 5, wherein the coherently accumulating step is performed after said step of computing the Fourier transform and in such a way as to coherently accumulate said transformed vectors in the frequency domain.

7. The method according to claim 6, wherein said coherently accumulating step comprises a step of canceling a phase shift of a partial result of said accumulation, before adding a new contribution to said partial result.

8. The method according to claim 1, wherein said step of receiving and sampling comprises a step of storing said sampled signal into a delay line.

9. The method according to claim 8, wherein the delay line is a delay line with N taps.

10. The method according to claim 9, wherein said local replica signal is stored in a matrix data structure comprising Mn N-long vectors, where Mn corresponds to a number of columns in the matrix data structure and N corresponds to a number of rows of the matrix data structure, each for storing a segment of N samples of said code, and wherein successive sample segments of said code are sequentially stored into successive vectors of said matrix, the despreading step comprising a step of multiplying N times one vector of said matrix by the content of said delay line, said delay line being respectively updated with samples of said received signal.

11. The method according to claim 10, further comprising a step of searching a maximum, after performing at least one scan, by means of said multiplication, on all vectors of said matrix, and further comprising a step of ascertaining the acquisition by means of comparing said maximum with a threshold.

12. The method according to claim 11, further comprising:
estimating, starting with a result of said step of computing the Fourier transform, a noise power; and
adaptively varying said threshold, based on said estimated noise power.

13. An acquisition system configured to acquire a direct-sequence spread spectrum signal transmitted on a carrier frequency and modulated with a code signal of length equal to Nc chips, to determine a code delay of said spread spectrum signal and a Doppler shift with respect to said carrier frequency, said determination being performed on a discrete two-dimensional space of M possible code delays and F possible frequency shifts, the acquisition system comprising:
a delay line configured to receive and sample said spread spectrum signal to obtain a sampled spread spectrum signal;
a vector multiplier configured to despread said sampled spread spectrum signal with a local replica signal of said code signal for a plurality of possible code delays between said sampled signal and said replica signal, said vector multiplier configured to despread using consecutive long segments of the sampled signals, the long segments being of length N, where N is a submultiple integer of a sample number denoted by M of the local replica signal, a number Mn of the despreaded segments of the sampled signals being given by Mn=M/N; and
a Fourier transformer configured to compute a Fourier transform, wherein said frequency search is a parallel frequency search performed on said despreaded spread spectrum signal, said Fourier transform being a fractional Fourier transform, wherein the vector multiplier is configured to despread, using each of said Mn segments of the local replica signal, N possible successive delays between said local replica signal and sampled signal.

14. A Global Navigation Satellite System (GNSS) signal receiver comprising:
an acquisition system configured to acquire a direct-sequence spread spectrum signal transmitted on a carrier frequency and modulated with a code signal of length equal to Nc chips, to determine a code delay of said spread spectrum signal and a Doppler shift with respect to said carrier frequency, said determination being performed on a discrete two-dimensional space of M possible code delays and F possible frequency shifts, the acquisition system comprising:
a delay line configured to receive and sample said spread spectrum signal to obtain a sampled spread spectrum signal;
a vector multiplier configured to despread said sampled spread spectrum signal with a local replica signal of said code signal for a plurality of possible code delays between said sampled signal and said replica signal, said vector multiplier configured to despread using consecutive long segments of the sampled signals, the long segments being of length N, where N is a submultiple integer of a sample number denoted by M of the local replica signal, a number Mn of the despreaded segments of the sampled signals being given by Mn=M/N; and
a Fourier transformer configured to compute a Fourier transform, wherein said frequency search is a parallel frequency search performed on said despreaded spread spectrum signal, said Fourier transform being a fractional Fourier transform, wherein the vector multiplier is configured to despread, using each of said Mn segments of the local replica signal, N possible successive delays between said local replica signal and sampled signal.

* * * * *